June 15, 1937.   W. C. BULL   2,084,293
APPARATUS FOR PRODUCING LAMINATE GLASS
Filed Feb. 19, 1932   3 Sheets-Sheet 1
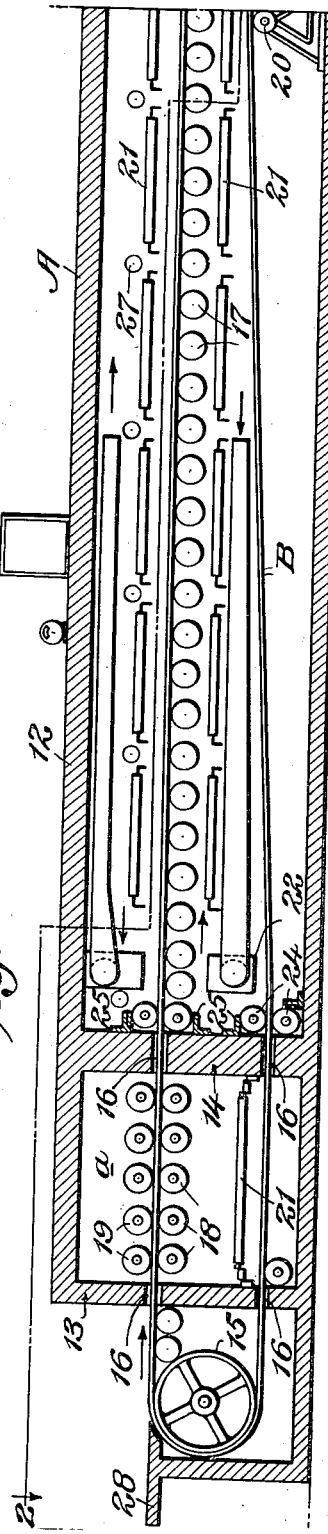
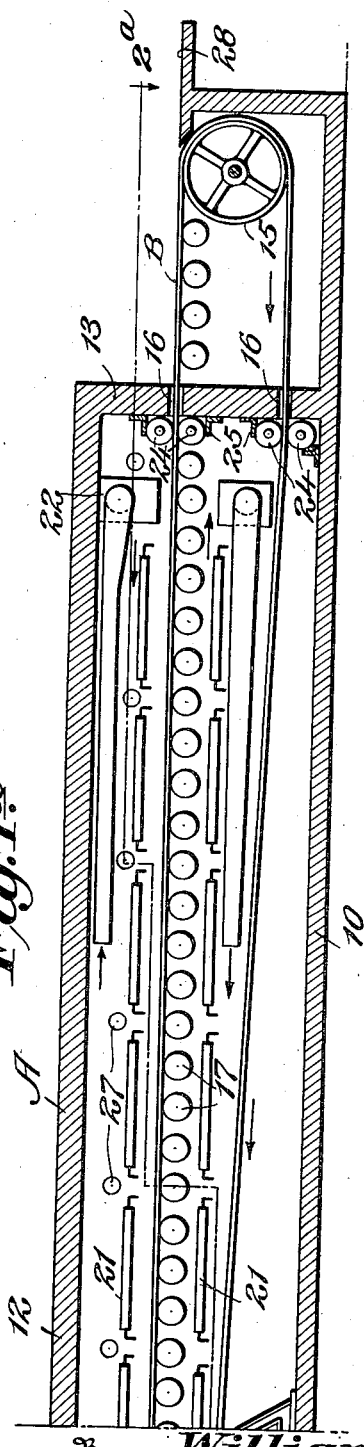
Inventor
William C. Bull,
By D. P. Wolhaupter Attorney

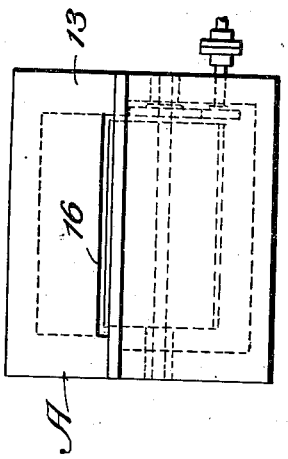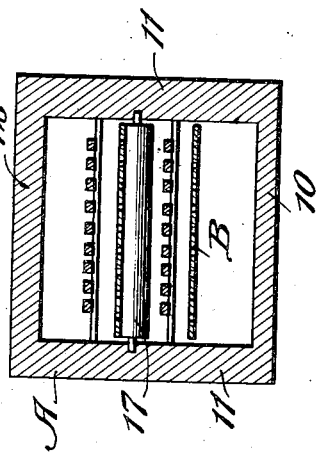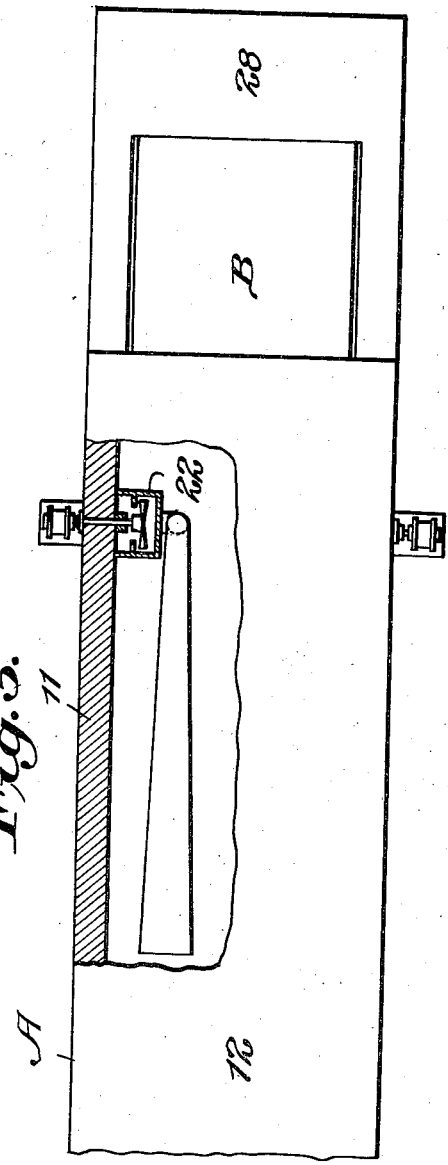

June 15, 1937. W. C. BULL 2,084,293
APPARATUS FOR PRODUCING LAMINATE GLASS
Filed Feb. 19, 1932 3 Sheets-Sheet 3
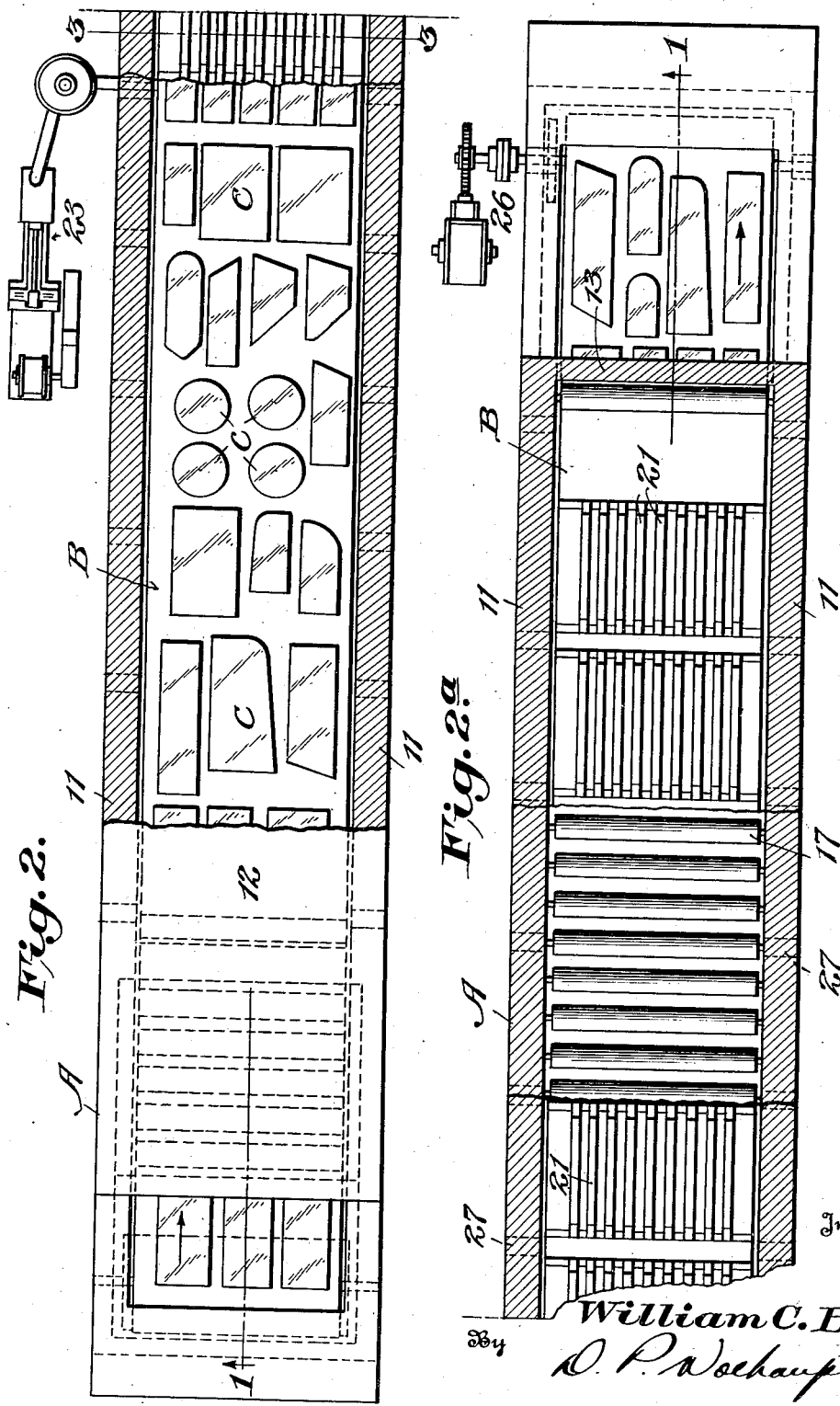

Patented June 15, 1937

2,084,293

UNITED STATES PATENT OFFICE 2,084,293

APPARATUS FOR PRODUCING LAMINATE GLASS

William C. Bull, Brooklyn, N. Y.

Application February 19, 1932, Serial No. 594,133

3 Claims. (Cl. 49—81)

This invention relates to a novel method and apparatus for producing by a continuous operation a laminate glass product of the so-called "safety" or scatterless type, and has generally in view a new means for the rapid and quantity production of laminate glass of that kind in a thoroughly practicable and satisfactory manner and at relatively low cost.

One of the objects of the invention is to carry forward the essential principles of my prior patents, No. 1,539,239 dated May 26, 1925; No. 1,553,667, dated September 15, 1925; No. 1,575,969, dated March 9, 1926; No. 1,632,363, dated June 14, 1927; and No. 1,805,389, dated May 12, 1931. That is to say, it is proposed to carry forward, in a continuous process machine, the essential features of subjecting the glass sandwich to pressure in a series of oven chambers, in the presence of dry heat and controlled temperature, under conditions of handling to assure uniformity of heat and pressure necessary to maintain a high quality product, with the added advantage of increased speed of production and avoidance of risk in breakage of the glass during each step of the process, thereby materially reducing the cost of the finished product.

With the foregoing and various other purposes in view, which will become more fully apparent as the nature of the invention is better understood, the same consists in the novel method, and in the novel features of construction, combination and arrangement of parts of the apparatus as will be hereinafter more fully described, illustrated in the accompanying drawings and defined in the appended claims.

In the drawings, wherein like characters of reference denote corresponding parts in the different views:—

Figures 1 and 1a are vertical, longitudinal sections through the respective end portions of an apparatus for the production of laminate glass in accordance with the invention.

Figures 2 and 2a are horizontal sections through the respective end portions of the apparatus on the line 2—2a of Figs. 1 and 1a.

Figure 3 is a transverse section on the line 3—3 of Fig. 2.

Figure 4 is an elevation of the delivery end of the apparatus.

Figure 5 is a top plan view, partly in section, of a portion of the apparatus.

Referring first to the specific embodiment of the apparatus illustrated in Figs. 1 to 5 of the drawings, A designates, generally, an oven and B an endless conveyor mounted for travel through the same.

As illustrated, the oven A is of elongated form and preferably is of rectangular cross section, the same being of suitable height and width and being formed either of heat insulating material or from other material suitably lined or encased for heat insulating purposes. Said oven comprises a bottom wall 10, side walls 11, 11, a top wall 12 and end walls 13, 13, and in accordance with the invention a vertical, transverse partition 14 is located near one of the end walls 13 to provide a so-called prefixing chamber $a$ at one end of the apparatus.

The endless conveyor B is in the form of a relatively wide belt of suitable heat resisting material trained over pulleys 15 suitably mounted at points spaced outwardly from the respective ends of the oven, and, as shown, horizontal slots 16 are formed in the end walls 13 and the partition 14 of the oven for the passage of the respective upper and lower reaches of the belt into and through the oven proper and the prefixing chamber $a$.

Within the oven proper and, if necessary or desirable, between the pulleys 15 and the ends of the oven, the upper reach of the belt B is supported by numerous horizontally arranged rollers 17 which may be formed of metal and which may have hard surfaces, while within the prefixing chamber $a$ the said upper reach of the belt is supported by a series of similarly arranged rollers 18 having surfaces of a preferably yielding nature for cooperation with a companion series of similar rollers 19 disposed above the upper reach of the belt. The lower reach of the belt passes over a roller 20 arranged medially thereof whereby said lower reach is held from sagging and whereby the upper reach is maintained taut. The belt is preferably perforate. The foraminous or perforate character of the belt B permits direct action through the belt, at least in part, of the ambient air pressure against the bottom components of glass units instead of indirectly thereagainst.

Within the oven proper and within the prefixing chamber are provided suitable electrical heating units 21 for obtaining desired operating temperatures in the oven proper and in said chamber, and preferably these units are thermostatically controlled whereby a desired temperature may be constantly maintained. Alternatively, the oven and the prefixing chamber may be heated by steam or other fluid circulated through pipes suitably arranged within the oven and said chamber.

At 22 are designated fans or blowers of any suitable type arranged at suitable points to circulate the air within the oven, thus to assist in maintaining a substantially uniform temperature throughout the area thereof.

Compressed air is adapted to be supplied to the oven A in any suitable manner, as, for example, by means of the compressor conventionally illustrated at 23, to build up and to maintain a suitable operating pressure within the oven, and in order to prevent the escape of air through the slots 16 in the end walls of the oven, suitable slot sealing means are provided. In the present instance such means comprises for each slot a pair of rollers 24, 24 disposed, respectively, above and below and in contact with the related reach of the belt B, together with suitable flexible strips or wipers 25 secured to the wall of the oven to either side of each slot 16 and wiping against the rollers 24.

The belt B is adapted to be driven in any suitable or desired manner; for example, by means of a motor 26 geared to the shaft of one of the pulleys 15.

In the sides and, if desired, in the top of the oven are provided suitably sealed and suitably located observation openings 27 through which the various different parts of the interior of the oven may be viewed.

Preferably but not necessarily, shelves 28 are provided flush with the upper reach of the belt B and outwardly of the respective pulleys 15 to facilitate the placing of the laminate glass product on said reach of said belt and removal of the same therefrom.

Assuming a suitable operating temperature and pressure to exist in the oven A, and the belt B to be in operation with the respective reaches thereof moving in the direction of the arrows; i. e., with the upper reach moving from left to right as viewed in Figs. 1 and 1ª, the operation of the apparatus is as follows: The laminate glass assemblies or sandwiches c, each composed of two or more sheets of glass with interposed membrane or binders of suitable material, such as celluloid or other material, and preferably but not necessarily previously cut to desired size and shape, are placed upon that part of the upper reach of the belt B that is moving into the prefixing chamber a and are carried by said reach of the belt through the slot 16 in the end wall of the oven into said prefixing chamber and between the belt and the series of rollers 19. As a consequence, since the upper reach of the belt is supported against downward movement by the series of rollers 18, the initial action of the apparatus is to effect by means of the two series of rollers 18 and 19 a mechanical pressing together of the assembled sheets of materials and an initial "setting" or prefixing of the glass sheets and the interposed membrane or membranes prior to the same entering the oven A. From the prefixing chamber the upper reach of the continuously moving belt B carries the individual sandwiches or articles through the slot 16 in the partition 14 between the sealing rollers 24 into the oven A through which they are slowly advanced to the opposite or discharge end of the oven. When the articles enter the oven they are, of course, subjected to the temperature and pressure existing therein, and as the temperature is predetermined and maintained to obtain a consistency of the membranes or binders and a temperature of the glass best suited to permit the ambient air pressure to effect a clamping of the glass sheets into intimate adhesive contact with the membrane or membranes, as the case may be, the result is that by the time the laminate glass sandwiches reach the discharge end of the oven and pass outwardly therefrom, through the slot 16, they are efficiently bound together. As the finished laminate glass products are removed from the belt at the discharge end of the apparatus, composites to be treated by the apparatus are placed on the belt at the feed end of the apparatus, and thus the operation is continuous and rapid and requires the services of only two attendants, one at the feed end and one at the delivery end of the apparatus. Moreover, by subjecting the sheets of the composites to an ambient air pressure the sheets are subjected throughout their areas to uniform pressure and particularly high grade products free of imperfections in the binding together of the sheets are obtained.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. Apparatus for the production of a laminate glass product comprising an oven, a perforated belt having a reach thereof extending through the oven and through apertures in oppositely disposed walls thereof, the glass units composed of superimposed sheets of glass with an interposed binder being adapted to be placed on said reach of said belt for travel therewith through the aperture in one of said walls into and through the oven and from the latter through the aperture in the other wall, means for air sealing said aperture, means for heating the oven, and means for maintaining an ambient air pressure within the oven.

2. Apparatus for the production of a laminate glass product comprising an oven, a prefixing chamber in communication with said oven, a perforated conveyor for moving the glass units composed of superimposed pieces of glass with an interposed binder through said prefixing chamber and from the latter into and through the oven, means for mechanically pressing the pieces of glass together during their passage through the prefixing chamber, means for heating the oven, and means for creating and maintaining an ambient air pressure therein.

3. Apparatus for the production of a laminate glass product comprising an oven, a prefixing chamber in communication with said oven, a perforated conveyor for moving the glass units composed of superimposed pieces of glass with an interposed binder through said prefixing chamber and from the latter into and through the oven, means for mechanically pressing the pieces of glass together during their passage through the prefixing chamber, means for heating the oven, means for heating the prefixing chamber, and means for creating and maintaining an ambient air pressure in said oven.

WILLIAM C. BULL.